United States Patent Office 3,265,770
Patented August 9, 1966

3,265,770
BUTYL RUBBER-POLYETHYLENE COMPOSITIONS
Douglas Cameron Edwards, Sarnia, Ontario, Canada, assignor to Polymer Corporation Limited, Sarnia, Ontario, Canada, a body corporate
No Drawing. Filed Mar. 12, 1963, Ser. No. 264,723
Claims priority, application Canada, Apr. 14, 1962, 846,831
15 Claims. (Cl. 260—889)

This invention relates to the preparation of butyl rubber-polyethylene vulcanizates. It is known that polyethylene is technologically compatible with butyl rubber. When minor proportions of butyl rubber are blended into polyethylene, the flexibility, resistance to environmental stress cracking and low temperature properties of polyethylene are improved. On the other hand, the addition of minor proportions of polyethylene to butyl rubber improves the hardness, toughness, resistance to oxidative degradation of butyl vulcanizates and dimensional stability of extrusions of butyl rubber compounds. Vulcanizates in which the butyl rubber predominates have been successfully applied to the manufacture of materials such as electrical insulations, weather stripping, curing bags, etc.

The vulcanization of butyl rubbers conventionally has been carried out by the application of sulfur, quinoid or resin based curing systems. Such systems are most effective when points of olefinic unsaturation are present within the polymer molecules. Polyethylene, being essentially saturated, will not respond properly to these curatives. It has recently become known that polyethylene can be cross-linked by the application of organic peroxides or peresters in combination with high temperatures. When the organic peroxides or peresters were applied to the vulcanization of butyl rubbers, it was found that these polymers were either degraded or the resulting vulcanizates possessed poor physical properties. A survey of the art reveals that blends of butyl rubber with polyethylene have been vulcanized in several different ways:

(a) By the incorporation of a vulcanization system effective for only the butyl portion of the blend, then vulcanizing;
(b) By the incorporation of a vulcanization system for the polyethylene portion of the blend, then vulcanizing;
(c) By incorporating a vulcanization system for each polymer, then vulcanizing;
(d) By partially vulcanizing the butyl rubber with a butyl rubber curative, then blending it with polyethylene and more curative for the butyl rubber, then vulcanizing;
(e) By heating polyethylene with sulfur, preferably in conjunction with a metal oxide or sulfide, then blending in a rubber and a peroxide and vulcanizing.

Due to the nature of the vulcanization processes involved, it has been typical to obtain vulcanizates with widely varying properties. Depending on the proportions of butyl rubber and polyethylene in the blends and on whether the curatives were effective for vulcanizing the rubber or the polyethylene, the properties of one or the other of the polymers predominated in the vulcanizates. Additionally ozone resistance of the vulcanizates under strain has been deficient and the odour of the products cured with peroxides has been objectionable.

It has now been found that a good balance of the desirable properties of each polymer can be realized in the vulcanizates of blends of butyl rubber and polyethylene along with good ozone resistance under strain and the objectionable peroxide odor eliminated by blending restricted proportions of the two polymers and processing the blends under the particular conditions and sequence specified.

More particularly, the aforementioned and other improvements are attained by a process comprising blending 40–60 parts by weight of a butyl rubber, 40–60 parts by weight of a solid homopolymer of ethylene and 0.1–10.0 parts, preferably 0.5–2.0 parts, by weight of total polymers of an organic peroxide, at a temperature sufficiently elevated to obtain a homogeneous blending of the components with less than 50% peroxide decomposition; raising the temperature and masticating the blend at a temperature and time combination such as to effect a decomposition of more than 50% of the remaining initially added peroxide; lowering the temperature to a point where vulcanization of the butyl rubber is substantially negligible; mixing into the blend a vulcanizing agent for the butyl rubber component and shaping and vulcanizing the thus prepared blend. Preferably the initial blending of the butyl rubber, polyethylene and peroxide is carried out at a temperature above the final crystalline melting point of the polyethylene but below that at which substantial decomposition of the peroxide is obtained. Also desirably, the hot mastication step is carried out under conditions of such severity for peroxide decomposition that substantially more than 50% of the remaining peroxide becomes decomposed, e.g. 60–100% becomes decomposed.

It has further been found that the presence in the blend of a small amount, e.g. up to 1.0 part and preferably less than 0.5 part by weight of sulfur based on the total polymer, during the hot mastication step modifies and reduces the degradative effect of the peroxide on the butyl polymer. In some applications, therefore, the presence of this agent will be desirable. It is conceivable that other butyl vulcanizing agents such as the quinoid curatives will have an effect similar to that of sulfur.

Butyl rubbers have been defined as polymers prepared by the copolymerization of 80–99.9 weight percent of isobutylene with 0.1–20 weight percent of one or more diolefinic hydrocarbons having 4–14 carbon atoms per molecule. 2-methyl butadiene-1,3, more commonly known as isoprene, is the most generally preferred diolefin. The copolymerization reactions are normally carried out at very low temperatures, e.g. −70° C. to −120° C. in an inert solvent for the monomers, such as methyl chloride, with the aid of a Friedel-Crafts catalyst as exemplified by aluminum chloride. In commercially available butyl rubbers the mole percent unsaturation varies from about 0.7 to about 3.0 although butyl rubbers having lower and higher mole percent unsaturations have been prepared. In applications requiring polymer flexibility and high ozone resistance, use of the slow curing lowest unsaturation butyl rubbers is required. The present invention permits the employment of the faster curing higher unsaturation butyl rubbers with no resultant penalty in ozone resistance and with the added advantages of better dimensional stability, hardness, tear strength and solvent, water and electrical resistance.

Polyethylene is commercially available in two basic forms—the higher density material prepared at lower temperatures and pressures with the aid of the recently discovered Ziegler catalysts, and the lower density material which has been known for a longer period of time and which is prepared at higher temperatures and pressures. The high density polyethylenes have densities of about 0.94–0.96 at 25° C. and final crystalline melting points of about 125–135° C. while the low density polyethylenes have densities of about 0.90–0.93 and final crystalline melting points of about 105–120° C. While both high and low density solid polyethylenes can be used in the present invention, the low density material is preferred since it blends more easily with the butyl rubber and imparts somewhat improved extrusion and finishing characteristics to the blends as well as superior flexibility in the finished products.

In carrying out the process it is preferable to mix the butyl rubber and the polyethylene before incorporating the organic peroxide. This may be carried out on an ordinary rubber mill or in an internal mixer. In order to assure complete colloidizing of the two components, i.e. the obtaining of a homogeneous blend, the mixing step should be performed at a temperature above the final crystalline melting point of the polyethylene.

The organic peroxide is next incorporated into the polymer blend. The time required will normally be about 1–8 minutes but may be longer. It may be done while maintaining the blend at the temperature at which it was formed, but if this temperature is at a level at which more than 50% of the peroxide is decomposed before it becomes thoroughly distributed throughout the blend, it is desirable to lower the polymer blend temperature to a point at which the rate of peroxide decomposition is low, i.e. less than 20% or substantially negligible during its incorporation. The temperatures at which the individual peroxides begin to decompose at an appreciable rate will, of course, vary somewhat. For dicumyl peroxide, which is the organic peroxide presently most favoured for use in this invention, it is known that about 50% of the peroxide is decomposed when exposed to the following temperature-time combinations:

(a) 125° C. for 205 minutes
(b) 130° C. for 110 minutes
(c) 135° C. for 60 minutes
(d) 140° C. for 32 minutes
(e) 150° C. for 9.6 minutes
(f) 160° C. for 2.8 minutes
(g) 170° C. for 0.8 minute Thus, when employing dicumyl peroxide, it is desirable to effect its incorporation into the blend at a temperature of below 150° C. and preferably below about 135° C. to keep peroxide decomposition at a low value. The corresponding temperature levels for peroxide incorporation when other organic peroxides are employed, are readily determined. Examples of other organic peroxides are 2,5-di-(tertiarybutylperoxy) 2,5-dimethyl hexane, di-tertiarybutylperoxide and 2,5-di-(tertiarybutylperoxy)-2,5-dimethylhexyne-3.

After the peroxide has been uniformly distributed throughout the polymer blend, the temperature is raised and the blend is masticated until more than 50% of the remaining initially added organic peroxide has been decomposed. Blends containing dicumyl peroxide should be subjected to conditions of greater severity for peroxide decomposition than the temperature-time combinations listed in the previous paragraph. Corresponding conditions can be determined for other peroxides. It is understood, of course, that the mastication should be carried out at temperatures below those at which either of the two polymers begins to undergo significant thermal degradation.

On completing the decomposition of the organic peroxide, the temperature of the blend is lowered and there is next uniformly incorporated into it an agent which is effective for vulcanizing the butyl rubber portion of the blend. Such agents are the various butyl rubber vulcanizing systems which are well known in the art. As stated previously, sulfur, quinoid and resin based curing systems are most commonly used. This vulcanizing agent is normally employed in amounts ranging from 0.1 to 15 parts per 100 parts by weight of butyl rubber and is most conveniently incorporated at a temperature of about 80–105° although temperatures as high as 115° C. or lower than 80° C. might safely be used in some cases depending on the activity of the vulcanizing agent and the stiffness of the polymer blend. In the sulfur-based systems it is usually desirable to have an activator such as zinc oxide and an accelerator present. The accelerator may be one or more of compounds such as an alkyl thiuram sulfide exemplified by tetramethyl thiuram disulfide and tetraethyl thiuram disulfide; an aromatic thiazyl sulfide such as benzothiazyl disulfide; a metal alkylthiocarbamate, selenium dimethyldithiocarbamate and zinc dibutyldithiocarbamate, a softener-accelerator such as stearic acid, etc. In the quinoid-based systems on oxidizing agent is usually present. Quinoid vulcanizing agents include paraquinone dioxime and dibenzoyl paraquinone dioxime and the oxidizing agents employed with them include inorganic and organic oxidizers such as a lead oxide and benzothiazyl disulfide. The resin type vulcanizing agents are exemplified by the multicyclic phenol dialcohols and their metal salts such as 4-phenyl, 4-octyl and 4-tertiarybutyl derivatives of 2,6-dimethylol phenol and their zinc salts. They may be halogen modified, such as with bromine and chlorine. An example of the latter is 2,2'-methylene-bis-(4-chloro-6-methylol phenol). Activators are usually employed with the resins, such as stannous chloride dihydrate, N-bromosuccinimide, dibromodimethyl hydantoin, polymeric 2-chlorobutadiene-1,3, brominated copolymers of isobutylene and isoprene, chlorosulfonated polyethylene, etc.

In addition to the butyl rubber vulcanizing systems, various other materials including fillers such as carbon blacks, clays, silicas, etc.; softeners such as waxes, resins, oils, etc.; colouring pigments; antioxidants, etc., may be incorporated into the blends. The criteria for the amounts and types of vulcanizing systems and other materials used are well known in the art and their usage is determined by the intended application of the final vulcanizing.

After the polymer blend has been compounded, it is shaped to the desired configuration and heated to effect the vulcanization. The time and temperature to which the compounded stock must be heated to effect vulcanization is variable—depending on the degree of activity of the vulcanization system, dimensions of the material being vulcanized, the properties desired in the final vulcanizate, etc. Generally, it is necessary to heat the compound to a temperature of 135–200° C. Within this range the desired degree of vulcanization will be obtained in most cases within the time period of less than one minute to two hours, although in some cases a longer time may be required.

The following examples are presented to describe the invention in more detail.

EXAMPLE I

A blend of 60 parts of an isobutylene-isoprene copolymer butyl rubber having an ML–8–100° C. Mooney of 45 and 3 mole percent unsaturation and 40 parts of Marlex 1531 (registered trademark for a polymer of ethylene having a density of 0.917, melting point of 106° C. and a melt index of 0.3) was prepared in the following manner:

Butyl rubber was banded on a mill at 121° C. and the polyethylene was added and mixed until a homogeneous blend was obtained. 2.5 parts of 40% active dicumyl peroxide were then added and mixed with the blend. The mill rolls were then heated to 149° C. and the blend was masticated for 20 minutes at 149–160° C. Samples of the masticated blend were obtained at 0, 5, 10 and 20 minutes and tested for Mooney viscosity and solubility in benzene and decalin. The results are shown in Table I.

Table I

| Mastication time (minutes) | 0 | 5 | 10 | 20 |
|---|---|---|---|---|
| Mooney viscosity (ML–4' at 100° C.) | 65.5 | 54.5 | 45.5 | 31.0 |
| Percent soluble in benzene at room temp.[1] | 48.2 | 52.8 | 50.0 | 46.2 |
| Percent insoluble in decalin at 140° C.[2] | 0 | 12.8 | 25.0 | 23.3 |

[1] Measure of soluble butyl rubber.
[2] Measure of insoluble polyethylene.

The results indicate that the processability of the masticated blend improved as shown by the reduced Mooney values even though the polyethylene components were insolubilized to a high degree.

The samples taken during mastication were compounded using the recipe as shown in Table II.

Table II

|  | Pts. |
|---|---|
| Polymer blend | 100 |
| SRF carbon black | 50 |
| Zinc oxide | 3 |
| Stearic acid | 1.2 |
| Altax [1] | 0.6 |
| Tellurac [2] | 1.2 |
| Sulfur | 0.9 |

[1] Registered trademark for a benzothiazyl disulfide accelerator.
[2] Registered trademark for a tellurium diethyl dithiocarbamate accelerator.

The compounds were cured at 145° C. The stress-strain properties determined on micro samples are given in Table III.

Table III

| Mastication time | 0 | 5 | 10 | 20 |
|---|---|---|---|---|
| Tensile strength (p.s.i.): |  |  |  |  |
| 20' cure | 1,380 | 1,335 | 1,360 | 1,415 |
| 40 | 1,380 | 1,345 | 1,515 | 1,435 |
| 80 | 1,460 | 1,475 | 1,515 | 1,450 |
| Elongation percent at break: |  |  |  |  |
| 20' cure | 435 | 395 | 335 | 370 |
| 40 | 370 | 350 | 330 | 320 |
| 80 | 355 | 340 | 340 | 310 |
| Modulus at 300% elongation, (p.s.i.): |  |  |  |  |
| 20' cure | 1,150 | 1,140 | 1,300 | 1,275 |
| 40 | 1,250 | 1,260 | 1,450 | 1,380 |
| 80 | 1,360 | 1,405 | 1,480 | 1,480 |

The above data show that good physical properties are maintained in the vulcanizates in spite of the polymer degradation caused by the heat treatment with the peroxide.

Similar results were obtained for compounds made from the same blend, but masticated in the presence of 2.5 parts of 40% active dicumyl peroxide and 0.2 part of sulfur. In the presence of sulfur, the blend did not degrade as readily since the Mooney viscosity was reduced only to 43.5 after 20 minutes mastication at 149° C. The blend was completely soluble in hot decalin. Solubility of the masticated blend in benzene at room temperature was reduced to only 36% after 20 minutes mastication suggesting that the butyl rubber component of the blend was grafted onto the insoluble polyethylene.

EXAMPLE II

Three blends of 60 parts butyl rubber having an ML–8–100° C. Mooney of 45 and 3 mole percent unsaturation and 40 parts Marlex 1531 polyethylene were prepared on the mill as in Example I. Insulation type fillers and curatives along with dicumyl peroxide and sulfur were added as shown in Table IV. A sample of low unsaturation butyl rubber of the type employed when very high ozone resistance is required in flexible insulation compounds was used as a comparison control.

Table IV

|  | A | B | C | D |
|---|---|---|---|---|
| Butyl (3.0 mole percent unsaturation) | 60 | 60 | 60 |  |
| Polyethylene | 40 | 40 | 40 |  |
| Butyl (0.7 mole percent unsaturation) |  |  |  | 100 |
| Whitetex #2 [1] | 100 | 100 | 100 | 100 |
| Zinc Oxide | 5 | 5 | 5 | 5 |
| Dicumyl peroxide (40% active) |  | 2.5 | 2.5 |  |
| Sulfur |  |  | 0.2 |  |

[1] Registered trademark for a very white electrical grade complex silicate clay filler.

Each of A, B, C and D was charged separately to a Type B Banbury mixer and masticated for 10 minutes at 149–160° C. and 77 r.p.m. After cooling, 23.6 parts, per 100 parts of butyl rubber in the blends of Kenmix AC–104 (registered trademark, a mixture consisting of 25.5% p,p'-dibenzoyl quinone dioxime, 42.5% red lead, 2.0% sulfur and 30.0% Kenflex N) were added to each of A, B, C and D on a cold mill. (Kenflex N is a registered trademark for an aromatic hydrocarbon resin plasticizer.) Samples of each compound were cured for 20, 40 and 80 minutes at 145° C. and the physical properties of the vulcanizates were determined. The results are given in Table V. The masterbatch Mooney was determined on each mix before the filler was added; the compound Mooney and extrusion processability were determined after the filler was added and the heat treatment was completed; and the Mooney scorch was determined after all of the compounding had been completed.

Table V

|  | A | B | C | D |
|---|---|---|---|---|
| Masterbatch Mooney, ML–4–100° C. | 101.5 | 91 | 91 | 68 |
| Compound Mooney, ML–4–100° C. | 94 | 63.5 | 82.5 | 62 |
| Extrusion processability at 104.4° C. (inches/minute at 0.65 grams/inch) | [1] 56 | [1] 62 | [1] 46 | 60 |
| Mooney scorch at 125° C. (minutes for 40 point Mooney rise) | 17 | 17 | 15.5 | 9 |
| Tensile strength, p.s.i.: |  |  |  |  |
| 20' cure | 570 | 330 | 390 | 695 |
| 40' cure | 640 | 680 | 640 | 570 |
| 80' cure | 620 | 640 | 700 | 630 |
| Elongation, percent at break: |  |  |  |  |
| 20' cure | 450 | 360 | 315 | 640 |
| 40' cure | 310 | 420 | 400 | 600 |
| 80' cure | 310 | 280 | 420 | 645 |
| Modulus at 300% elongation, p.s.i.: |  |  |  |  |
| 20' cure | 550 | 330 | 390 | 335 |
| 40' cure | 610 | 610 | 640 | 350 |
| 80' cure | 620 |  | 680 | 335 |
| Shore A–2 hardness: |  |  |  |  |
| 20' cure | 77 | 62 | 67 | 48 |
| 40' cure | 80 | 78 | 76 | 46 |
| 80' cure | 80 | 81 | 79 | 47 |
| Tensile Set, percent: |  |  |  |  |
| 20' cure | 102 | 124 | 134 | 40 |
| 40' cure | 94 | 148 | 126 | 35 |
| 80' cure | 90 | 82 | 98 | 37 |
| Tear Strength, pounds/inch: |  |  |  |  |
| 20' cure | 175 | 145 | 155 | 95 |
| 40' cure | 155 | 175 | 150 | 90 |
| 80' cure | 135 | 170 | 150 | 100 |
| Percent Swell in ASTM Fuel No. 2 (24 hrs. at 25° C.), 40' cure | 60 | 53 | 56 | 189 |
| Ozone Resistance (hours to first crack at 48.8° C., 25 p.p.h.m. ozone), 40' cure, triangular cross-section spiral specimen at— |  |  |  |  |
| 0–10% strain | 500 | 500 | 500 | 500 |
| 10–20% strain | 456 | 500 | 500 | 500 |
| 20–30% strain | 264 | 500 | 500 | 500 |
| 30–40% strain | 264 | 500 | 500 | 500 |

[1] The temperature of 104.4° C. is too low for good extrusion of butyl-polyethylene blends.

The compounding recipe employed in this example was one suitable for use in evaluating the applicability of the polymers for electric insulation purposes. From Table V it is evident that a very attractive balance of properties is obtained in the peroxide treated polymer blend vulcanizates in that there is no loss in tensile strength; scorch safety is much superior; hardness values are desirably higher; tear strengths are markedly superior; resistance to solvents at room temperature is much superior and ozone resistance is at least equivalent to the low unsaturation butyl rubber even though a much higher unsaturation butyl rubber was used in the blends and superior to the ozone resistance of similar blends not pretreated with peroxide.

EXAMPLE III

A 60/40 blend of butyl rubber having an ML–8–100° C. Mooney value of 45 and mole percent unsaturation of 3.0 and Marlex 1531 was prepared as in Example I with 2.5 parts of 40% active dicumyl peroxide and 0.2 part sulfur. 50 parts of an easy processing channel carbon black was then incorporated into the mix. The mix was placed into a Banbury mixer and masticated at 149–160° C. for 10 minutes. A control compound of 100 parts of a butyl rubber having a Mooney of 45 and an unsaturation of 1.4 mole percent mixed with 50 parts of an easy processing channel carbon black but containing no peroxide or sulfur was masticated in a similar manner. Each mix was then compounded, vulcanized and tested as shown in Table VI.

Table VI

| | | |
|---|---|---|
| Butyl (3.0 mole percent unsaturation) | 60 | |
| Marlex 1531 (polyethylene) | 40 | |
| Butyl (1.4 mole percent unsaturation) | | 100 |
| EPC carbon black | 50 | 50 |
| Dicumyl peroxide (40% active) | 2.5 | |
| Sulfur | 0.2 | |
| Zinc oxide | 5.0 | 5.0 |
| Stearic acid | 3.0 | 3.0 |
| Benzothiazyl disulfide | 0.5 | 0.5 |
| Tetramethyl thiuram disulfide | 1.0 | 1.0 |
| Sulfur | 2.0 | 2.0 |
| Extrusion processability at 104.4° C. (in./min.) | 50 | 76 |
| Mooney scorch at 145° C. (minutes for 40 point Mooney rise) | 11.2 | 11.2 |
| Aged properties (after ageing in air oven for 48 hrs. at 121.1° C., 80 min. cure): | | |
|   Tensile strength, p.s.i. | 1,965 | 2,590 |
|   Elongation, percent at break | 220 | 625 |
|   Modulus, p.s.i. at 100% elongation | 1,020 | 220 |
|   Shore A–2 hardness | 82 | 55 |
| Percent Swell in ASTM Fuel No. 2, 24 hrs. at 25° C. | 66.4 | 209.6 |
| Ozone resistance, hours to first crack at 48.8° C. and 25 p.p.h.m. ozone, triangular cross-section spiral specimen at— | | |
|   0–10% strain | >500 | 168 |
|   10–20% strain | >500 | <24 |
|   20–30% strain | 120 | <24 |
|   30–40% strain | 120 | <24 |
| Threshold strain, percent | 24 | 6 |

Here again an attractive balance of properties is indicated for the peroxide treated blend when employing carbon black as filler and a different sulfur-based curing system.

EXAMPLE IV

Butyl rubber having an ML–8–100° C. Mooney value of 75 and a mole percent unsaturation of 2.2 was blended in various proportions with Marlex 1531 polyethylene in a Banbury mixer. There were then incorporated into each blend a peroxide, a filler, zinc oxide and stearic acid. Sulfur was also included in half of the blends. Starting from an initial Banbury temperature of about 120° C. the highest temperature reached in any of the blends during the 5 minutes employed in incorporating the above ingredients was 150° C. After cooling, the Banbury temperature was raised to about 140° C. and each compound was masticated for 10 minutes with the temperature being allowed to rise freely. The highest temperature reached was 188° C. On removal from the Banbury, the heat-treated blends were cooled again, bonded on a mill set at about 80° C., compounded with sulfur and accelerators and vulcanized at 147.2° C. for 40 minutes. The ozone resistance of each of the vulcanizates was determined and compared with that of a butyl rubber having 0.7 mole percent unsaturation and an ML–8–100° C. Mooney value of 45—such as is employed in electrical wire and cable insulations where high ozone resistance is desired.

The superior ozone resistance of the claimed heat-masticated butyl rubber-polyethylene blends is again in evidence even though the butyl rubber used in the blend had a much higher level of unsaturation than that of the control. The results also show that the proportion of butyl rubber in the blend must be below 70%.

EXAMPLE V

The procedure of Example IV was repeated using different butyl rubbers, compounding recipes and vulcanization temperatures. The results are recorded in Table VIII.

Table VIII

| | | | |
|---|---|---|---|
| Butyl (3.0 mole percent unsaturation, ML-8-100° C.=45) | | 60 | |
| Butyl (1.4 mole percent unsaturation, ML-8-100° C.=45) | 60 | | 60 |
| Marlex 1531 polyethylene | 40 | 40 | 40 |
| Dicumyl peroxide (40% active) | 2.5 | 2.5 | 2.5 |
| Sulfur | 0.2 | 0.2 | 0.2 |
| Whitetex #2 filler | 100 | 100 | 100 |
| Zinc oxide | 5 | 5 | 5 |
| Curatives (added after heat mastication): | | | |
|   Dicumyl peroxide | | 5 | 5 |
|   Kenmix AC-104 | 14.1 | 14.1 | 14.1 |
| Maximum temp. during initial compounding (6 min. mixing), ° C. | 138 | 143 | 138 |
| Maximum temp. during heat treatment (10 minute mixing), ° C. | 168 | 165 | 168 |
| Mooney scorch at 125° C. (minutes for 40 point Mooney rise) | 25 | 25 | 25 |
| Vulcanization temperature, 165.5° C.: | | | |
|   Hardness, Shore A-2 instantaneous: | | | |
|     20′ cure | 85 | 83 | 83 |
|     40′ cure | 85 | 84 | 83 |
|     60′ cure | 85 | 84 | 83 |
|   Tensile strength, p.s.i.: | | | |
|     20′ cure | 680 | 670 | 620 |
|     40′ cure | 650 | 680 | 640 |
|     60′ cure | 650 | 630 | 540 |
|   Elongation, percent at break: | | | |
|     20′ cure | 340 | 400 | 370 |
|     40′ cure | 360 | 410 | 300 |
|     60′ cure | 390 | 380 | 300 |
|   Modulus at 300% elongation, p.s.i.: | | | |
|     20′ cure | 680 | 550 | 600 |
|     40′ cure | 650 | 560 | 640 |
|     60′ cure | 650 | 550 | 540 |
| Ozone resistance, hours to first crack at 48.8° C. and 25 p.p.h.m. ozone, triangular cross-section spiral specimen: | | | |
|   40′ cure | >500 | >500 | >500 |
| Threshold strain, percent | >40 | >40 | >40 |

The attractive balance of properties and superior ozone-resistance is demonstrated for the blends in this recipe.

What is claimed is:

1. A process comprising blending 40–60 parts by weight of a rubbery copolymer of 80–99.9 weight percent isobutylene and 0.1–20 weight percent of at least one $C_4$–$C_{14}$ diolefinic hydrocarbon with 60–40 parts by weight of a solid polyethylene and 0.1–10 parts by weight of

Table VII

| | 1 | 2 | 3 | 4 | 5 | 6 | 7 |
|---|---|---|---|---|---|---|---|
| Butyl (2.2 mole percent unsaturation) | 40 | 50 | 70 | 40 | 50 | 70 | |
| Marlex 1531 (polyethylene) | 60 | 50 | 30 | 60 | 50 | 30 | |
| Butyl (0.7 mole percent unsaturation) | | | | | | | 100 |
| 2,5-bis (tertiary butyl peroxy)-2,5 dimethyl hexane (50% active) | 2 | 2 | 2 | 2 | 2 | 2 | |
| Sulfur | | | | 0.2 | 0.2 | 0.2 | |
| Whitetex #2 (Reg. trademark for an electrical grade complex silicate filler) | 125 | 125 | 125 | 125 | 125 | 125 | 125 |
| Zinc oxide | 5 | 5 | 5 | 5 | 5 | 5 | 5 |
| Stearic acid | 1 | 1 | 1 | 1 | 1 | 1 | 1 |
| Sulfur | 0.4 | 0.5 | 0.7 | 0.4 | 0.5 | 0.7 | 1 |
| Zinc dibutyl dithiocarbamate-accelerator | 0.6 | 0.75 | 1.05 | 0.6 | 0.75 | 1.05 | 1.5 |
| Zinc dimethyl dithiocarbamate accelerator | 0.6 | 0.75 | 1.05 | 0.6 | 0.75 | 1.05 | 1.5 |
| Benzothiazyl disulfide-accelerator | 0.4 | 0.5 | 0.7 | 0.4 | 0.5 | 0.7 | 1 |
| Maximum temperature ° C. during initial compounding (5 minute mixing) | 138 | 132 | 146 | 148 | 150 | 146 | |
| Maximum temperature ° C. during heat treatment (10 minute mixing) | 179 | 177 | 177 | 182 | 185 | 188 | 177 |
| Ozone resistance, hrs. to first crack at 48.8° C. and 25 p.p.h.m. ozone, triangular cross-section spiral specimen at— | | | | | | | |
|   0–10% strain | >500 | >500 | >500 | >500 | >500 | >500 | >500 |
|   10–20% strain | >500 | >500 | 168 | >500 | >500 | 168 | 360 |
|   20–30% strain | >500 | >500 | 120 | >500 | >500 | 120 | 264 |
|   30–40% strain | [1] 120 | 432 | 120 | >500 | >500 | 24 | 120 |
| Threshold strain, percent | | 38 | 17.5 | >40 | >40 | 14 | 14 |

[1] Broke.

an organic peroxide per 100 parts by weight of total polymers, at a temperature sufficiently elevated to obtain a homogeneous blending of the components with less than 50% peroxide decomposition; elevating the temperature and masticating the blend until more than 50% of the remaining undecomposed peroxide is decomposed; lowering the temperature to a point where vulcanization of the rubbery isobutylene-diolefinic hydrocarbon copolymer is substantially negligible; mixing into the blend a vulcanizing agent for the rubbery isobutylene-diolefinic hydrocarbon copolymer component of the blend and shaping and vulcanizing the thus prepared blend.

2. The process as claimed in claim 1 wherein up to 1.0 part by weight of sulfur, per 100 parts by weight of total polymers, is present in the blend during the elevated temperature mastication step.

3. The process as claimed in claim 2 wherein the peroxide is dicumyl peroxide.

4. The process as claimed in claim 3 wherein 0.5–2.0 parts by weight of dicumyl peroxide are employed per 100 parts by weight of total polymers.

5. The process as claimed in claim 2 wherein the rubbery isobutylene-diolefinic hydrocarbon copolymer is blended with the polyethylene at a temperature above the final crystalline melting point of the polyethylene.

6. The process as claimed in claim 4 wherein the rubbery isobutylene-diolefinic hydrocarbon copolymer is blended with the polyethylene at a temperature above the final crystalline melting point of the polyethylene.

7. A process comprising blending 40–60 parts by weight of a rubbery copolymer of isobutylene and at least one $C_4$–$C_{14}$ diolefinic hydrocarbon containing 0.7–3.0 mole percent unsaturation with 60–40 parts by weight of a solid polyethylene having a density of 0.90–0.93 and a final crystalline melting point of 105–120° C., and 0.1–10 parts by weight of an organic peroxide per 100 parts by weight of total polymers, at a temperature above the final crystalline melting point of the polyethylene for a time sufficient to obtain a homogeneous blending of the components, the temperature-time relationship being such that less than 50% of the peroxide is decomposed; elevating the temperature and masticating the blend until more than 50% of the remaining undecomposed peroxide is decomposed; lowering the temperature to a point below 115° C.; mixing into the cooled blend a vulcanizing agent for the rubbery isobutylene-diolefinic hydrocarbon copolymer component of the blend and shaping and vulcanizing the thus prepared blend.

8. The process as claimed in claim 7 wherein the rubbery isobutylene-diolefinic hydrocarbon copolymer is a copolymer of at least isobutylene and isoprene.

9. The process as claimed in claim 8 wherein up to 1.0 part by weight of sulfur, per 100 parts by weight of total polymers, is present in the blend during the elevated temperature mastication step.

10. The process as claimed in claim 9 wherein the peroxide is dicumyl peroxide.

11. The process as claimed in claim 10 wherein 0.5–2.0 parts by weight of dicumyl peroxide are employed per 100 parts by weight of total polymers.

12. The process as claimed in claim 9 wherein up to 0.5 part by weight of sulfur is employed.

13. The process as claimed in claim 11 wherein up to 0.5 part by weight of sulfur is employed.

14. The process as claimed in claim 13 wherein 60–100% of the remaining undecomposed peroxide is decomposed during the elevated temperature mastication step.

15. The process as claimed in claim 14 wherein less than 20% of the peroxide is decomposed during the initial blending step.

References Cited by the Examiner

UNITED STATES PATENTS 3,136,739    6/1964    Adamek et al. _____ 260—889

MURRAY TILLMAN, *Primary Examiner.*

D. J. BREZNER, *Assistant Examiner.*